United States Patent Office 2,737,582
Patented Mar. 6, 1956

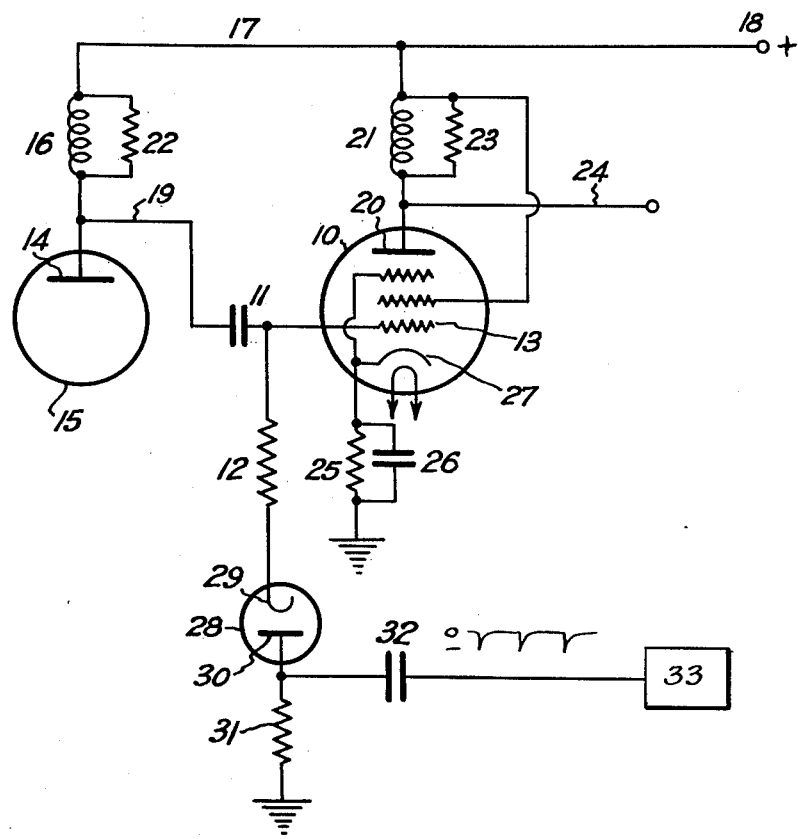

2,737,582

AUTOMATIC GAIN CONTROL ARRANGEMENT FOR PULSE SIGNALLING SYSTEM

Frank Ross Hall, Roseville, near Sydney, New South Wales, Australia, assignor to Amalgamated Wireless (Australasia) Limited, Sydney, New South Wales, Australia Application July 2, 1952, Serial No. 296,970

Claims priority, application Australia October 5, 1951

3 Claims. (Cl. 250—20)

The present invention relates to automatic gain control (AGC) circuit arrangements for pulse signalling systems and more particularly to improved means for controlling the operating time constant of AGC circuits in pulse receivers employed in aerial navigation.

A common disturbing feature in radar systems, both primary and secondary, is the existence of ground clutter or multiple echo effects. In primary radar systems various methods have been devised to alleviate these disturbing effects, such as "time controlled sensitivity" and "moving target indication" and the like.

In secondary radar systems—that is, systems employing an interrogator and a transponder, usually in different frequency channels—it is not so obvious that multiple echo effects can cause difficulty. However, it is so in practice, particularly in certain sites where geographical features or buildings create a large number of possible reflecting surfaces with different distance—or time—spacings. The difficulties mentioned can occur in either the interrogation or in the response links.

The present invention is particularly concerned with a secondary radar system which is generally referred to as DME (distance measuring equipment).

This system is usually employed to measure air to ground beacon distances in aerial navigation.

A DME system consists of an interrogator-responder unit carried in the aircraft and a ground (transponder) beacon. The aircraft unit, in effect, measures the time required for a pulse signal transmitted from the aircraft to make the double journey—from air to ground and then ground to air—and converts this time measurement into a distance reading, making due allowance for any deliberately introduced system time delays. The distance reading thus obtained is presented directly to the pilot on a meter which is calibrated in nautical miles. The indication is continuous to a selected ground beacon and the ground beacon usually identifies itself by replying in some particular coding method to confirm that the desired beacon is in fact the one replying.

In a very simple system using only a train of single pulses for interrogation and reply, reflection difficulties may not be too serious. However, it is generally desired to have some channelling method for selecting the desired beacon; this is achieved by the use of various interrogation frequencies or by employing interrogation pulse moding which is the use of multiple interrogation pulses separated by definite intervals varying in discrete steps. Sometimes both methods are used in combination.

Where two or more pulses with a definite interval are used for interrogating a particular beacon, decoding circuits in the beacon recognise or "decode" pulse groups of correct spacing for that beacon channel and replies are given only to correctly spaced interrogations. It will be fairly obvious that multiple reflections arising from the first pulse of such a group could interfere very seriously with the decoding arrangement, involving possibly false replies—that is replies to interrogations intended for another beacon channel—or no replies to a correct interrogation because of various paralytic effects in the beacon circuits.

These difficulties are in fact very serious in practice and various methods of minimising them have been devised. One such method is the use of instantaneous automatic gain control (IAGC) in the receiver—interrogation link—of the transponder beacon. The multiple reflections which are observed are of course lower in amplitude than the first arriving direct signal and are usually lower in amplitude the further they are spaced in time. Advantage is taken of this fact by employing the first—desired—signal to actuate gain controlling circuits which depress the receiver gain in a time small compared with the duration of the pulse and release or return the gain to normal in a relatively long time. By so doing the amplitude of the reflected pulses can be brought below a predetermined threshold and hence cause no trouble. The next direct pulse (e. g. the second pulse of a particular mode) will normally be the same in amplitude as the first direct pulse and will be accepted by the system.

In the Australian DME system the interrogation channelling is provided by twelve pulse modes with the pulse spacing varying in steps of 4 microseconds from 10 to 54 microseconds. IAGC with suitably chosen release time constants is generally employed in the beacon receiver IF amplifier to protect against multiple echo effects. With a large number of interrogating pulses and the release time constants necessary, the receiver threshold signal level tends to be changed, requiring a stronger signal. This causes discrimination against distant aircraft in favour of those closer to the beacon and consequently requires higher interrogation signal levels. There is some disadvantage in this fact, but by proper choice of release time constants and the channel spacing for the beacons likely to incur the heaviest traffic and other system parameters the results are acceptable in practice.

With regard to the response link and the aircraft receiver portion, ranging circuits, coding circuit, and the like, it is perhaps not quite so obvious that multiple reflections can cause difficulty. However, there are some serious difficulties which in practice give rise to two main effects.

The first effect is usually referred to as "range stealing." When the aircraft unit is "tracking" on synchronised replies from a beacon, the ranging reply is "gated" by appropriate circuits succeeding the receiver. This permits only the desired reply and other signals which may be within the finite gate width to effect the tracking. The gate width concerned is about plus or minus twelve microseconds from the gate centre. Echo signals originating from the first reply pulse are of course synchronised signals, as distinct from random unsynchronised "clutter" which can appear in the gates, but only rarely persists for a length of time sufficient to cause disturbance in operation. The echo signals, however, can be relatively persistent and the automatic tracking circuit can be seriously disturbed, giving an incorrect range reading by tracking directly on the echoes or settling down between the correct reply and an echo. As the gates are necessarily fairly wide in comparison with the timing accuracy desired in the system, the ranging errors thus created are of a serious order, particularly at the short ranges where the worst echo effects occur in practice. The second effect is associated with the coding system used in Australian DME. This coding system requires the introduction at the beacon of a second reply pulse—corresponding to every ranging pulse. This second pulse is usually spaced about thirty (30) microseconds from the ranging pulse and is keyed in Morse code characters by a code wheel, thus identifying a particular beacon. In the airborne unit the coding pulses are accepted in a gate circuit (of width about 3 microseconds) and utilised to key visual and aural indicators with the code characters. Where there are serious multiple echo effects, generally at short ranges from a beacon, sufficient echo pulses enter the gate to make the code characters unrecognisable. Disturbing effects would be created in any system where a second, or more, reply pulse was used for this or any other purpose.

IAGC could be used to reduce these disturbing effects. The rejection of echoes at some given spacing—e. g. 27–33 microseconds could be assisted by making the release time constant, of the IAGC circuit, very long.

This, however, would introduce a further serious disadvantage in the presence of random "clutter" signals of large amplitude (a common practical condition); the effective receiver sensitivity may be reduced for such a large proportion of the time that the wanted signals are either rejected or seriously "counted down."

The object of the present invention is to provide an IAGC system for use in pulse receivers, particularly receivers employed in applications of the type outlined above, in which the disadvantages associated with prior art IAGC arrangements are substantially eliminated or greatly minimised.

A further object of the invention is to provide an improved IAGC system with a gated release time constant.

The above objectives are achieved in accordance with the present invention by providing, at the receiver, means for rendering said receiver receptive for incoming signal energy at predetermined intervals, and means for utilising a potential derived from said former means to control the release time constant of the IAGC system.

More specifically, according to the present invention, a device of unidirectional conductivity is included in the time constant circuit of an IAGC system and a potential derived from means associated with the receiver for rendering said receiver receptive for incoming signal energy for predetermined intervals is utilised to vary the conductivity of said device in such manner as to control the release time constant of the IAGC system.

For a more complete understanding of the invention and the manner in which it is to be carried out attention is now directed to the following description in connection with the accompanying drawing which illustrates one practical embodiment of the invention.

In order to simplify the description, only that portion of a radio receiver which is essential for an understanding of the invention is shown in the drawing.

The valve 10 is connected in a circuit adapted to amplify energy of radio or intermediate frequency. Energising potentials from a source of high frequency voltage, such as for example the output of a preceding amplifying stage or from the output circuit of a mixing valve, are applied to the input circuit of the valve 10.

The input circuit of the valve 10 includes a condenser 11 and a resistor 12 adapted to provide instantaneous automatic gain control (IAGC) potentials on the control grid 13.

Any convenient HF coupling arrangement may be employed for feeding HF energy from the output circuit of the preceding valve to the input circuit of the valve 10. In the present example the well known tuned anode system of coupling is employed. The anode 14 of the valve 15 is connected to a suitable source of positive potential (not shown) through an inductance coil 16, lead 17 and terminal 18. Inductance coil 16, together with its distributed capacity and associated circuit capacity, is adapted to resonate at the desired operating frequency.

Amplified HF energy developed across the inductance coil 16 is applied to the control grid 13 of the valve 10, through the lead 19 and the condenser 11. This is a very convenient method of coupling as the condenser 11 associated with such an arrangement may be utilised in the IAGC network.

The anode 20 of the valve 10 is connected to the positive potential supply lead 17, through an inductance coil 21 which also resonates at the desired operating frequency.

Damping resistors 22—23 are connected across the inductance coils 16—21 respectively to increase the bandwidth of frequencies passed by the amplifier. Amplified energy developed across the resonant inductance coil 21 may be applied through the lead 24 to the input circuit of a succeeding amplifier stage or to the input circuit of a demodulating detector (not shown).

Biasing potentials for the control grid may be provided by the usual resistance-capacity network 25—26 connected between the cathode 27 of the valve 10 and ground. This network 25—26 functions in known manner to provide automatic biassing potentials which are applied to the control grid 13 through the grid resistor 12. Energising potentials may be applied to the screen grid and heater electrodes of the valve 10 in any convenient manner.

In prior art circuit arrangements employing IAGC, the grid resistor 12 is connected between the control grid and ground. H. F. energy passing through the receiver will be rectified at the grid 13 of the valve 10 if it is of sufficient amplitude to overcome the normal bias developed across the network 25—26. This action causes the condenser 11 to accumulate a charge which adds to the negative voltage on the grid 13, thereby reducing the gain of valve 10 in a time that is small compared with the duration of the signal.

The negative charge accumulated on the condenser 11 will leak away through the grid resistor 12. The discharge or release time constant of the IAGC circuit depends upon the capacity of the condenser 11 and the resistance of the resistor 12. With a condenser 11 of fixed capacity the release time constant of the circuit may be increased or decreased by varying the resistance of the resistor 12.

In the pulse receivers, particularly the receivers used in DME systems, an IAGC circuit is included in the receiver to minimise the effects of undesirable echoes or ground clutter. In order to carry out this function, the value of the resistor 12 employed in such IAGC circuits is selected to provide a long release time constant.

This arrangement, however, tends to change the receiver threshold level, necessitating a stronger signal and thus discriminating against distant aircraft in favour of those closer to the beacon and consequently requiring higher interrogation signal levels. Suitable choice of various parameters yields acceptable results at the ground beacon end of the system.

In the case of the initiating end of the system (airborne unit) the ideal arrangement would be to provide an IAGC circuit with a normally short release time constant in order to maintain maximum sensitivity when random clutter interference is present and also to control the time constant of the IAGC circuit in synchronism with the expected time of arrival of the desired signal in such a manner as to provide a long release time constant for gain control potentials developed by the desired signal. In other words, an IAGC circuit with a gated release time constant is required.

The present invention seeks to satisfy this requirement. In accordance with the invention a device of unidirectional conductivity such as a diode rectifier 28, is connected in series with the grid resistor 12 in the input circuit of the valve 10.

The arrangement of the connections is such that the cathode 29 of the device 28 is connected to the end of the resistor 12 which is remote from the grid 13, i. e. the low potential end, and the anode 30 of the device 28 is connected to ground through a resistor 31.

A gating potential of negative polarity derived from any convenient source 33 according to the operating requirements of the receiver is applied to the anode 30 through a condenser 32.

In the absence of a negative gating potential on the anode 30 of the device 28 the device 28 is conductive and exhibits a low internal resistance which has little effect on the normal release time constant of the IAGC circuit. In these circumstances incoming signals with sufficient amplitude to overcome the cathode bias will leave a charge on the condenser 11 which will leak away through the resistor 12, the device 28 and the resistance 31 in a time determined by the normal constants of the circuit.

If, however, a negative potential, the value of which is greater than the maximum bias developed at the grid 13 of the valve 10, is applied to the anode 30 of the device 28, the device 28 is rendered non-conducting and thus constitutes an open circuit in the discharge path of the condenser 11. In consequence of this any gain control potentials developed on the condenser 11 by signals with the required amplitude during the time that the negative potential is applied to the anode 30 of the device 28 will be maintained; that is, they will not be able to leak away until such time as the negative potential on the anode 30 is removed. The effect of applying a negative potential to the anode 30 of the device 28 is to prolong the release time constant of the IAGC circuit for the duration of this negative potential.

The duration or time constant of the negative potential is determined by the capacity of the condenser 32 and the resistance of the resistor 31. By appropriate selection of those components the release time constant of the IAGC circuit may be controlled as desired.

It will be readily appreciated from the above description that the normal short release time constant of the IAGC circuit may be increased to any desired value at any particular time during the operation of the receiver by appropriate timing of the application of the negative potential to the anode 30 of the device 28.

The improved IAGC arrangement described above is particularly adapted for use in receivers employed in DME systems. If a negative potential, the amplitude of which is greater than the maximum bias developed at the grid 13 of the valve 10, is applied to the anode 30 of the device 28 just before the arrival of the desired HF signal, the gain control potential developed by such signal will be prolonged for a time equivalent to the duration of the negative potential on the anode 30 of the device 28.

By appropriate selection of the time duration of the negative potential on the anode 30 of the device 28 the IAGC potential can be maintained effective over the necessary time interval to eliminate the effects of echo after receiving each pulse in the pulse train.

This provides an IAGC circuit with a long release time constant which gives the desired protection against undesirable echoes or ground clutter without the disadvantages associated with a permanently long time constant.

Although the invention has been described with respect to a particular practical application, it will be readily appreciated that it has a wide range of usefulness, particularly in receivers employed for the reception of signal energy transmitted in the form of pulses.

Furthermore, it will be appreciated that some variations may be made to the circuit arrangement described in order to suit various requirements without affecting the scope of the invention.

I claim:

1. In a receiver for use in pulse signalling systems an automatic gain control arrangement wherein a capacitor and a resistor including two serially connected resistance sections are connected to the control grid of an amplifying valve in said receiver to produce through grid rectification in said valve instantaneous automatic gain control potentials on said control grid, a diode rectifier serially connected in said resistor between said resistance sections, the cathode of said diode being connected to said control grid through a path including one of said resistance sections and the anode of said diode being connected to ground through the other of said resistance sections, and more including a time constant circuit comprising a capacitor and said other of said resistance sections for applying biassing potentials of negative polarity to the anode of said diode for controlling its conductivity and to provide a gated release time constant for the automatic gain control potentials developed on said control grid.

2. The invention as claimed in claim 1, characterized in that the biasing potentials of negative polarity applied to the anode of said diode are in the form of regularly recurring negative pulses.

3. The invention as claimed in claim 1, characterized in that the biasing potentials of negative polarity applied to the anode of said diode are in the form of regularly recurring negative pulses, the repetition frequency of which is such that the negative potential is applied to the anode of said diode just before the expected time of arrival of the desired incoming signal energy at said control grid.

References Cited in the file of this patent

UNITED STATES PATENTS

| | | |
|---|---|---|
| 2,449,985 | Gloess | Sept. 29, 1948 |
| 2,459,798 | Dettman | Jan. 25, 1949 |
| 2,563,052 | MacSorley | Aug. 7, 1951 |
| 2,576,552 | Wittenberg | Nov. 27, 1951 |
| 2,629,840 | Weiss | Feb. 24, 1953 |
| 2,637,773 | Bedford | May 5, 1953 |